United States Patent [19]

Honey et al.

[11] Patent Number: 5,280,169
[45] Date of Patent: Jan. 18, 1994

[54] METHOD AND APPARATUS FOR LIMITING OPTICAL RADIATION INTENSITY AT AN OPTICAL SENSOR USING SOLID PARTICLES OSCILLATING IN AN ELECTRIC FIELD

[76] Inventors: Richard C. Honey, 1801 Parkwood Dr., San Mateo, Calif. 94403; Robert A. Brown, 598 Edgecliffe Way, Redwood City, Calif. 94062; Karen M. Nashold, 198 Andover St., San Francisco, Calif. 94110; Richard C. Adamo, 3324 Vernon Ter., Palo Alto, Calif. 94303

[21] Appl. No.: 995,200

[22] Filed: Dec. 22, 1992

[51] Int. Cl.⁵ .................. H01J 3/14; G02F 1/01; G02B 5/23
[52] U.S. Cl. .................... 250/216; 359/241
[58] Field of Search .......... 250/216, 229, 237; 359/240, 241, 243, 244, 245, 290, 296, 297, 738, 886; 372/11, 21, 25

[56] References Cited

U.S. PATENT DOCUMENTS

| | | | |
|---|---|---|---|
| 3,509,063 | 4/1970 | Teague et al. | 252/300 |
| 3,587,424 | 6/1971 | Paine | 95/11 |
| 3,620,597 | 11/1971 | Schwartz et al. | 359/243 |
| 4,431,257 | 2/1989 | Born | 350/1.5 |
| 4,597,639 | 7/1986 | Seitel et al. | 350/363 |
| 4,723,248 | 2/1988 | Harter et al. | 372/25 |
| 4,829,269 | 5/1989 | Minahan | 332/7.51 |
| 4,832,466 | 5/1989 | Nishimura et al. | 359/241 X |
| 4,890,075 | 12/1989 | Pohlmann et al. | 330/4.3 |
| 4,900,135 | 2/1990 | Yuasa et al. | 359/241 |
| 4,952,035 | 8/1990 | Yuasa et al. | 359/241 |
| 5,059,003 | 10/1991 | Haus et al. | 359/241 |
| 5,080,469 | 1/1992 | McCahon et al. | 359/241 |
| 5,172,278 | 12/1992 | Tutt | 359/241 X |

OTHER PUBLICATIONS

"Infrared Sensor Protection by a Liquid-Cell Optical Limiter" by K. Nashold et al, presented at Seventh DOD Conference on DEW Survivability, Vulnerability and Effects, 9–12 May 1989 Naval Postgraduate School, Monterey, Calif.

"Comparison of Visible and Infrared Optical Limiters Based on Particle Suspensions" R. Brown et al. Paper presented at the 27th IRIS IRCM Symposium, 1 through 5 May 1989, Laurel, Md.

"Contact Charging of Micron-Sized Particles in Intense Electric Fields" A. Y. H. Cho, Journal of Applied Physics, vol. 35, No. 9, Sep. 1964, pp. 2561–2564.

Primary Examiner—David C. Nelms
Assistant Examiner—John R. Lee
Attorney, Agent, or Firm—Victor R. Beckman

[57] ABSTRACT

Method and apparatus for limiting optical radiation to an optical sensor are disclosed for protecting the sensor against damage from high intensity optical radiation. A fixed electric field is established between a pair of spaced electrodes by connection of the electrodes to a DC voltage source. Small solid particles oscillate back and forth in the electric field between the electrodes. Incident optical radiation is focused at a focal plane at the oscillating solid particles, and energy transmitted through the oscillating particles is focused at the optical sensor. The transmittance of the particle-containing space is substantially constant for incident optical radiation intensity up to a threshold level below which the sensor is undamaged by the radiation. Above the threshold, oscillating particles are heated to a high temperature for vaporization, ionization and thermal expansion thereof for increased scatter and absorption thereby limiting optical radiation to the sensor to an intensity below which damage to the sensor occurs.

19 Claims, 2 Drawing Sheets

METHOD AND APPARATUS FOR LIMITING OPTICAL RADIATION INTENSITY AT AN OPTICAL SENSOR USING SOLID PARTICLES OSCILLATING IN AN ELECTRIC FIELD

ORIGIN OF THE INVENTION

The U.S. Government has certain rights in this invention pursuant to Contract No. N62229-87-C-0262 awarded by the Naval Air Development Center (now the Naval Air Warfare Center), Department of Defense.

FIELD OF THE INVENTION

This invention relates generally to method and means for coupling incident optical radiation to a sensor, and more particularly to such coupling method and means wherein optical waves which exceed a threshold intensity level are limited so as to protect the sensor against damage by excessive optical wave intensity.

BACKGROUND OF THE INVENTION

Systems for protecting an optical electromagnetic wave-responsive device, such as an optical sensor, from a high intensity laser beam are well known as shown, for example, in U.S. Pat. No. 4,829,269 to Minahan. There, radiation is transmitted to the sensor through a nonlinear crystal and plasma switch. A harmonic component is produced at the nonlinear crystal, which component increases with increasing intensity of the incident radiation. The harmonic component from the nonlinear crystal initiates a state of nontransmittance of the plasma to block transmission to the sensor. The plasma is switched from a state of transmittance to a state of nontransmittance at an intensity level of the incident radiation below which damage to the sensor would occur.

In U.S. Pat. No. 4,431,257 to Born a device for protecting an optical or infrared window against damage by laser radiation is shown which includes a coolant flow channel for the flow of a gaseous or liquid coolant which is opaque to the laser radiation and transparent to visible and near-infrared radiation. The coolant comprises either $C_6H_{12}$ or $CH_4$.

A diffusion filter for a laser beam is shown in U.S. Pat. No. 3,587,424 to Paine, which filter comprises a laser light transparent receptacle containing a suspension of small particles having an average diameter larger than the wavelength of the laser light. A colloidal suspension of milk or metal particles in water is employed in the receptacle, which particles reflect laser light for diffusion of the laser light beam.

A substantially stable colloidal suspension of carbon black particles of an average size under 20 $\mu$m for use in rear view mirrors is shown in U.S. Pat. No. 3,509,063 to Teague et al. The suspension liquid comprises a solution of an organic liquid, together with a dispersing agent. The suspension is located in an enclosure with a window and containing a movable mirror. By moving the mirror away from the window the layer of suspension between the mirror and window is increased to produce an opaque screen in front of the mirror to inhibit the reflection of light from the mirror.

An optical limiter using Cr-doped crystalline solids and organic solutions, such as laser dyes, saturable absorber dyes, etc. is shown in Harter et al, U.S. Pat. No. 4,723,248.

In Seitel et al, U.S. Pat. No. 4,597,639, an optical radiation attenuating device is shown comprising either a mirror or optical transmitting component upon which the radiation impinges. Disposed on the surface of the device are particles of material which emit electrons when the power of radiation impinging thereon is above an optical breakdown threshold. Above the threshold level, free electrons emitted from the particles ionize the adjacent gas, or atmosphere, to provide a shielding plasma. A nanosecond response time is provided by the plasma shield.

An optical radiation limiter is shown in U.S. Pat. No. 4,890,075 to Pohlmann et al, which includes a fluid, such as methanol, within which carbon particles are suspended. Radiation to be limited is focused at the suspension, and transmitted radiation is limited to a level below the detector damage level. Carbon particles absorbing high-intensity energy either form radiation scattering vapor bubbles around themselves, and/or become hot plasmas which also could act as absorbing and scattering sites. A major disadvantage of such suspended particle type limiters is the reduction in transmissivity in particular spectral bands due to the suspending medium prior to breakdown. This may limit their use in these bands.

Devices for causing solid particles to oscillate back and forth between a pair of spaced electrodes in a fixed electric field are well known. Such a device first was employed by Andrew Gordon, a Benedictine monk, to produce a device known as the "electric bells" and was later used by Benjamin Franklin as the basis of the "Franklin Chimes" used to detect electrified clouds associated with thunderstorms. "B. Franklin Experiments and Observations on Electricity Made at Philadelphia in America by Mr. Benjamin Franklin communicated in Several Letters to Mr. P. Collison of London SRS London". Printed and sold by E. Caves at St. Johns Gate - 1751.

In an article by A. Y. H Cho entitled, "Contact Charging of Micron-Sized particles in Intense Electric Fields", Journal of Applied Physics, Vol. 35, No. 9, Sept. 1964, pages 2561-2564, oscillation of small solid particles in an electric field between a pair of spaced electrodes is shown.

OBJECTS AND SUMMARY OF THE INVENTION

An object of this invention is the provision of an improved frequency agile optical radiation limiting method and means for coupling optical radiation to a sensor responsive thereto.

An object of this invention is the provision of an improved frequency agile optical radiation limiting method and means of the above-mentioned type wherein the limiter is responsive to the intensity of the incident radiation and limits transmission to the sensor to a level below which damage to the sensor occurs but without completely cutting off the transmission at high intensity levels.

An object of this invention is the provision of an improved frequency agile optical radiation limiting method and means of the above-mentioned type which operates rapidly in response to high intensity incident optical radiation so as to rapidly limit transmission to the sensor and therefore is particularly well adapted to prevent laser radiation from destroying the sensor.

An object of this invention is the provision of an improved frequency agile optical radiation limiting method and means of the above-mentioned type which is particularly well adapted for use in an optical imaging system.

An object of this invention is the provision of an improved frequency agile optical radiation limiting method and means of the above-mentioned type which is highly transparent to optical radiation up to a threshold level below which the sensor is undamaged by the optical radiation.

It here will be noted that the term optical radiation as used herein is not limited to light associated with vision but rather includes all electromagnetic waves with wavelengths greater than x-rays and shorter than microwaves.

The optical radiation limiter of the present invention includes a pair of spaced electrodes between which a fixed electric field is produced. Small solid particles of carbon, silver-coated glass spheres, or the like, are located in the electric field. When the particles come in contact with one or the other of the electrodes, they become charged. Having acquired the polarity of the electrode, they are forced away from it and are accelerated toward the opposite electrode where their charge is reversed and the process is repeated. The optical radiation is transmitted to the sensor between the electrodes, and is focused in the volume of the oscillating solid particles. Radiation from the limiter is refocused at the sensor. Below a threshold intensity level, transmittance of the path between the electrodes at the oscillating solid particles is substantially constant; the transmittance being determined by the concentration and size of particles in addition to the transparency of gas which may be included in the limiter. However, above the threshold level the transmittance is decreased so that optical radiation reaching the sensor is limited to an intensity below which damage to the sensor occurs. Such decrease in transmittance results from vaporization and ionization of particles when the threshold level is exceeded. Vaporization and ionization of particles, and ionization of surrounding gas, if present, results in rapidly expanding dense plasmas that greatly enhance scattering and absorption. The resultant increased scatter and absorption protects the sensor against damage by excessive optical radiation.

BRIEF DESCRIPTION OF THE DRAWINGS

The above and other objects and advantages of the invention will be better understood from the following description when considered with the accompanying drawings showing one embodiment of the invention. In the drawings.

DESCRIPTION OF THE PREFERRED EMBODIMENTS

Figure 1:
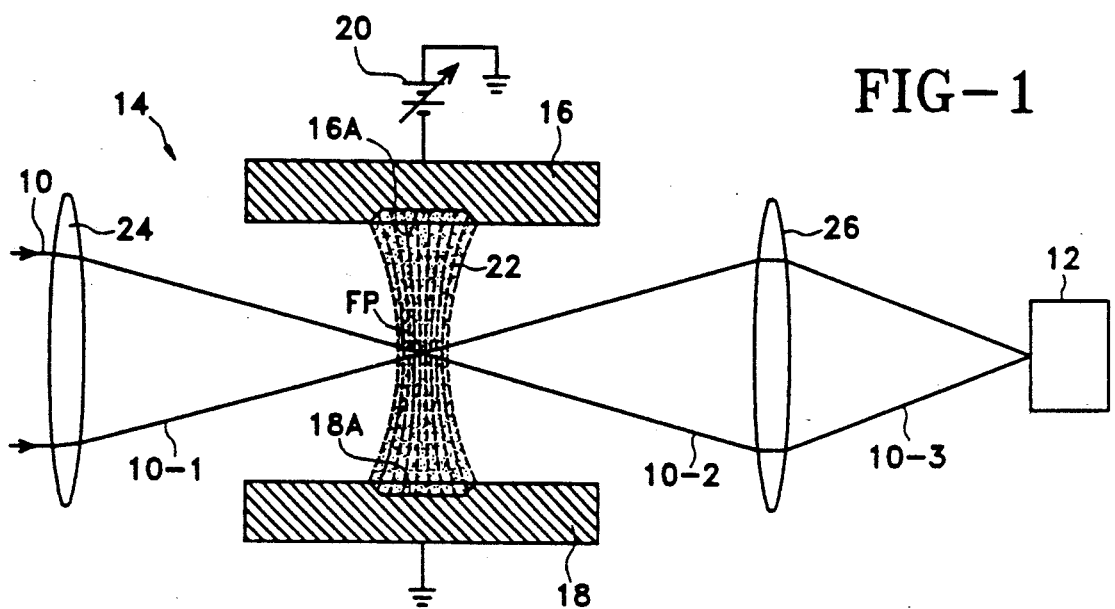
FIG. 1 is a cross sectional view of an optical radiation limiter embodying this invention which limiter is included in an arrangement for coupling incident optical radiation to an optical radiation sensor.

Reference first is made to FIG. 1 wherein a system for coupling optical radiation 10 from a source, not shown, to a radiation sensor 12 operable in the optical region is shown. Sensor 12 may include the eye, for example. Optical radiation, as noted above, is intended to include radiation in the range between, but not including, X-rays and microwaves. The coupling system may be used to protect the sensor against damage or destruction by, say, a laser beam.

The radiation limiter of the present invention, identified by reference numeral 14, is located in the path of the incident radiant energy beam 10 so that radiation to be sensed is transmitted through limiter 14 and thence to sensor 12. Limiter 14 comprises spaced electrodes 16 and 18 between which the beam travels in passage to the sensor. Gas, such as air, may be located in the space between said electrodes and a DC voltage source 20 is connected to the electrodes to establish a fixed electric field therebetween.

Small absorbing particles 22 of non-insulating material are located in the electric field, which particles oscillate back and forth between electrodes 16 and 18. When the particles come in contact with one or the other of the electrodes, they become charged. Having acquired the polarity of the electrode, they are forced away from it and are accelerated toward the opposite electrode, where their charge is reversed and the process is repeated. Although the particles are not literally suspended, their velocities are such that during a Q-switched laser pulse, the particles travel only a fraction of a micron. On the time scale of the laser pulse, the particles are essentially stationary, and essentially "suspended" between the electrodes. The small absorbing particles 22 absorb radiation 10 directed thereon. The voltage of DC source 20 may be varied to adjust the particle concentration that oscillates between the electrodes and thus the low level transmission.

The incident optical radiation 10 is focused at limiter 14 by focusing lens means 24 whereby the beam is focused at a focal point, FP, in the space containing the oscillating particles 22. Focused optical radiation from focusing lens 24 is identified by reference character 10-1, and optical radiation from the limiter is identified by reference character 10-2. Second focusing lens means 26 refocuses optical radiation from the limiter at sensor 12; the energy beam between focusing lens means 26 and sensor 12 being identified by reference character 10-3. If desired, a bandpass filter may be included in the radiation beam path ahead of limiter 14 to pass only optical radiation within a spectral band of interest in the region extending from ultraviolet to infrared.

Oscillating particles 22 may be concentrated adjacent to the focal point FP by use of shaped electrodes 16 and 18, such as those shown in FIG. 1. Facing depressions 16A and 18A are formed in the opposite electrodes 16 and 18, respectively, which depressions include generally inclined, or sloping, side walls. The electric field between the electrodes, at depressions 16A and 18A, is represented graphically by dashed lines in FIG. 1. Because of the depressions, oscillating particles 22, which are guided by the field lines, are thereby concentrated adjacent to focal point FP.

It is well known that high intensity levels of optical radiation will damage optical sensors. The optical radiation limiter of the present invention may be used in any desired system to protect the optical radiation sensor included therein from inadvertent or deliberate excessively intense beams of optical radiation. The novel oscillating particle limiter of this invention functions to limit optical radiation to an intensity level below that at which damage to the sensor occurs. As is well understood, optical radiation sensors often are employed in communications and imaging systems, which systems may require protection against high levels of intensity of optical radiation. An example of an imaging system which includes means for protecting the sensor against high levels of optical radiation is shown in the above-mentioned U.S. Pat. No. 4,829,269. The present invention is particularly useful in infrared imaging systems when, for example, infrared radiation from unknown sources is being imaged. However, as noted above, it is not limited to operation in the infrared region.

The gas included in the limiter transmits optical radiation within the selected radiation band. In the illustrated embodiment, the gas simply comprises ambient air. It here will be noted that in the modification of the invention shown in FIG. 3 wherein the electrodes and oscillating particles are shown inside a container, the container may be filled with a selected gas, or it may be evacuated, as desired. For example, air in the container may be replaced by one of the rare gases.

Oscillating solid particles 22 selected for use in this invention preferably have a diameter no larger than the shortest wavelength in the selected spectral band. For example only, for operation in the spectral band of 8–12 $\mu$m, solid particles having a diameter no greater than 8 $\mu$m are employed thereby keeping scattering negligible for low-energy optical beams. If operation with a band of shorter wavelengths of, say, between 3–5 $\mu$m is desired, then solid particles having a diameter no greater than 3 $\mu$m would be employed. The non-insulating solid particles may comprise, for example, silver-coated glass spheres, carbon particles, or the like.

Figure 2:
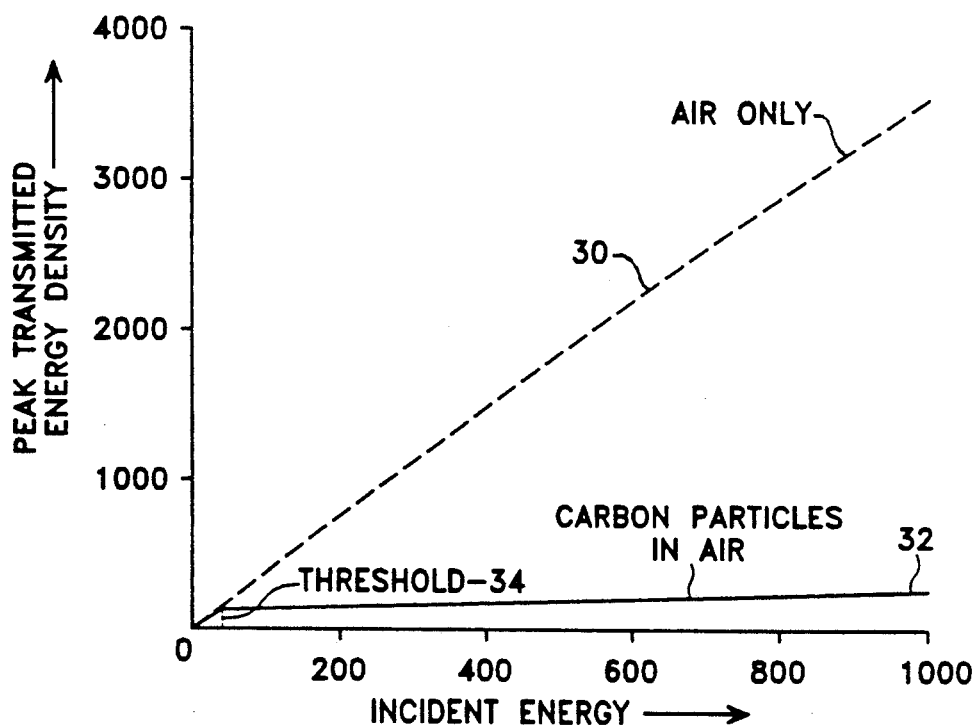
FIG. 2 is a graph showing peak transmitted energy density versus incident optical energy for air and for a limiter which includes carbon particles in air.

Reference now is made to FIG. 2 wherein graphs 30 and 32 of incident optical energy onto a sample versus peak transmitted energy density at the focal plane at sensor 12 are shown for samples of air and oscillating solid carbon particles in air, respectively. The graphs are intended for use in illustrating operation of the limiter of this invention. The graph for air is shown in broken line, and that for oscillating carbon particles in air is shown in solid line.

From FIG. 2, it will be seen that the graph 30 for air comprises a substantially straight line over the entire range of incident energy levels. It here will be noted that peak transmitted energy density shown in FIG. 2 is directly proportional to transmitted energy whereby a graph of transmitted energy versus incident energy for air also would comprise a substantially straight line. The straight line relationship over the entire range of incident energy levels indicates that the transmittance of air is substantially constant over said range; where transmittance is the ratio of transmitted energy to incident energy.

The transmittance of the oscillating particles is determined by the type, size, and concentration of particles. The transmittance is a constant up to a threshold level of incident energy identified by reference numeral 34. However, above threshold level 34, transmittance within the space, or volume containing the oscillating particles is decreased whereby energy transmitted through the limiter is limited to an intensity below that at which damage to sensor 12 occurs.

Each solid particle 22 in the limiter absorbs an amount of energy proportional to the energy density incident upon it and to the particle's absorption cross-section. Because the particles are small compared to a wavelength, the entire particle heats up simultaneously. When exposed to a high intensity pulse, such as an energy pulse from a Q-switched laser, particles are substantially instantaneously heated to a temperature at which vaporization, ionization and substantial thermal expansion occurs. With pulses of sufficiently high energy density, particles may be completely vaporized and ionized. The resulting vaporization and ionization results in rapidly expanding dense gases or plasmas that greatly enhance the scattering and absorption of the limiter. If the particles operate in air or other gas, air or gas adjacent to the vaporized and ionized particles may also be ionized or chemically react with the particle by-products to further contribute to the scattering and absorption of the limiter. (If the particles are located in an evacuated chamber, the plasma results solely from the vaporization and ionization of the particles.) As seen in FIG. 2, at laser levels above the threshold energy level, the transmittance of the limiter is greatly reduced thereby protecting sensor 12 against damage. Below threshold, the solid carbon particles are substantially transparent to the incident energy, and the limiter transmittance is comparable to that of air. It here is noted that since no liquid is required for "suspension" of the solid carbon particles, the limiter does not suffer from reduced transmissivity below threshold due to passage of the optical radiation through a liquid.

Two wavelength effects that are important for sensor protection include changes in laser spot size and changes in particle size-to-wavelength ratio. The effect of changes in spot size first will be considered. A laser that produces a diffraction-limited spot at the focal plane of the protected sensor 12 delivers the highest possible energy density and is thus most likely to cause damage. The area of a diffraction-limited Gaussian laser spot is approximately $$A = 4\lambda^2 F^2/\pi \qquad (1)$$

where $\lambda$ is the wavelength and F is the effective f—number of the focusing optics.

Therefore, the energy density at a focal plane will decrease by a factor of 16 if the wavelength is increased by a factor of 4, say from 3 $\mu$m to 12 $\mu$m. This decreased energy density has two consequences. In the focal plane of limiter 14, a decrease in energy density means an increase in the laser pulse energy required to trigger the limiter. However, in the focal plane of protected sensor 12, a decrease in energy density means an increase in the laser pulse energy required to damage the sensor. Consequently, increased spot size due to increased wavelength will have little effect on the ability of limiter 14 to protect infrared sensor 12.

A change in the ratio of particle diameter to wavelength (d/$\lambda$) results in changes in scattering and absorption effects of the particles. Because the absorption cross-section of small particles is proportional to d/$\lambda$, transmission by limiter 14 below threshold is greater at longer wavelengths for a given particle size. This transmission is given by:

$$T = exp(-c\sigma x) \qquad (2)$$

where c is the number concentration of particles, $\sigma$ is the extinction cross-section per particle, and x is the path length. The extinction cross-section is the sum of the absorption and scattering cross-sections:

$$\sigma = \sigma_a + \sigma_s. \qquad (3)$$

As noted above, particles with a diameter smaller than the shortest λ in the spectral band are employed. If particles with diameter d greater than λ were employed, then scattering below threshold may be increased to unacceptable levels for a given absorption.

The smaller the particle size, the greater the concentration of particles that may be employed. Although concentration has little effect on threshold, which depends mainly on the absorption cross-section of individual particles and intensity, increased particle concentrations do increase attenuation at higher laser energies and increase the probability of finding enough particles in the focal volume.

In addition to being smaller than the shortest wavelength in the spectral band to be limited, it is desirable that the solid particles have a uniformly high absorption coefficient. Carbon particles do have such a high absorption coefficient.

Although operation of the limiter of this invention is believed to be apparent, a brief description thereof now will be provided. Solid particles 22 having a diameter smaller than the smallest wavelength in the spectral band of interest are located between a pair of spaced electrodes 16, 18 across which a DC voltage source 20 is connected. For example only, an electrode spacing of approximately 1 cm may be used together with a voltage source 20 of approximately 10 kilovolts. The particles oscillate back and forth between the electrodes with an acceleration dependent upon the strength of the fixed electric field established by voltage source 20. For example only, and not by way of limitation, particles may be traveling on the order of 10 m/s when colliding with the electrodes. Concentration of particles is greatest adjacent to focus FP as a result of the convergence of the lines of force by the inclusion of depressions 16A and 18A at the opposing faces of electrodes 16 and 18.

Optical radiation within the spectral band to be sensed is transmitted to optical sensor 12 through limiter 14. The limiter is located at the focal plane of focusing lens means 24. Transmitted energy from limiter 14 is focused at sensor 12 by focusing lens means 26, with the sensor being positioned at the focal plane of lens means 26. So long as incident radiation remains below threshold level 34 (see FIG. 2) transmittance of the volume, or space, containing the oscillating solid particles 22 is substantially constant so that the sensor output provides a measure of optical radiation intensity at the sensor input. When a pulsed laser beam is received, solid particles 22 are heated in a brief period, measured in nanoseconds or less, to a high temperature where vaporization and ionization of particles take place. If the volume between electrodes contains a gas, gas adjacent to vaporized and ionized particles also is ionized. As a result of such heating, absorption and scattering of incident optical radiation is substantially increased whereby transmittance of the limiter is reduced as illustrated by graph 32 of FIG. 2. Radiation reaching the sensor during such high intensity input pulses is limited by limiter 14 to a level below that at which damage to the sensor occurs.

Figure 3:
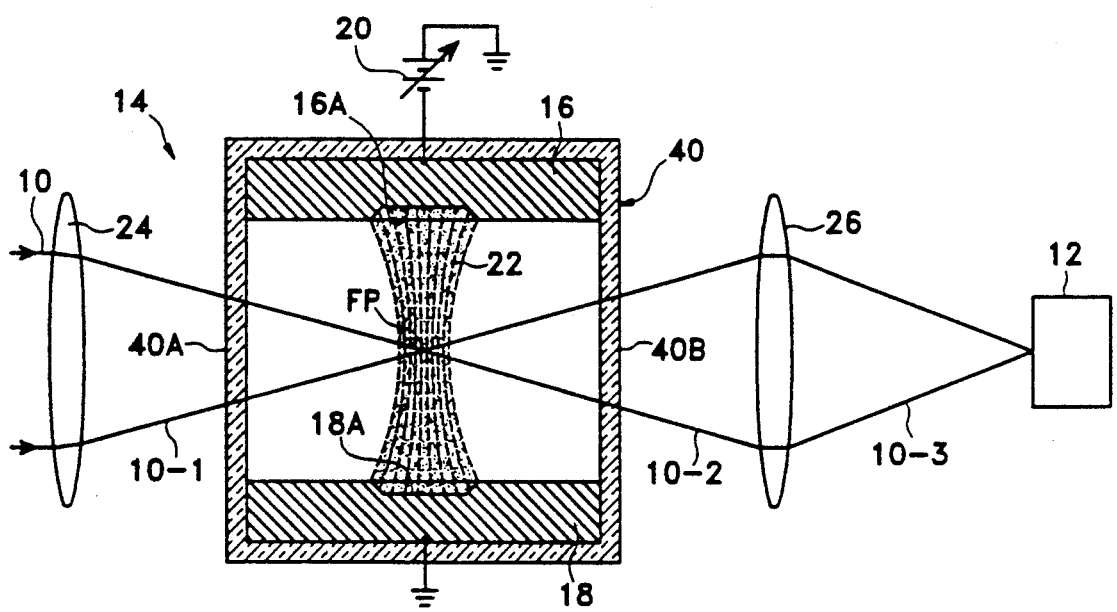
FIG. 3 is a cross sectional view which is similar to that of FIG. 1 but showing a modified form of this invention.

Reference now is made to FIG. 3 wherein a modified form of this invention is shown in which the electrodes 16 and 18, and oscillating particles 22, are located in a closed container 40. The container includes front and rear window walls 40A and 40B for transmittance of the radiation. Preferably, the beam is brought to a focus FP at a point in the space containing oscillating particles 22 substantially midway between the front and rear window walls 40A and 40B. As in the FIG. 1 arrangement, depressions 16A and 18A at the opposing faces of electrodes 16 and 18 provide for convergence of lines of force adjacent to focal point FP with the resultant concentration of oscillating particles 22 thereat. Container 40 is of adequate size to provide sufficient space between the focal point FP and container walls to prevent damage to the container when the limiter is exposed to high intensity radiation during operation in the energy-limiting mode. Gas may be evacuated from container 40 in which case only particles 22 are vaporized and ionized when operating in the energy-limiting mode. Alternatively, container 40 may be supplied with a suitable gas which also is ionized by the ionization of solid particles. For example, air may be replaced with one of the rare gases.

The invention having been described in detail in accordance with requirements of the Patent Statues, various other changes and modifications will suggest themselves to those skilled in this art. As noted above, gases other than air may be employed in the limiter. Additionally, solid particles 22 other than carbon particles or silver-coated glass spheres may be employed so long as they function substantially in the above-described manner. The invention is not limited to use of electrodes 16 and 18 formed with depressions 16A and 18A therein for converging the lines of force and particle concentration at the focal point FP. Also, where such "converging" depressions are employed, they are not limited to use of tapered sidewalls as illustrated. Other wall shapes may be used which also provide for converging of the lines of force between electrodes. It is intended that the above and other such changes and modifications shall fall within the spirit and scope of the invention defined in the appended claims.

We claim:

1. An optical limiting method for use in coupling incident optical radiation to an optical sensor responsive to said radiation, said method comprising transmitting incident optical radiation to the sensor through a space containing solid particles oscillating back and forth in an electric field, the transmittance of the particle-containing space being substantially constant for incident optical radiation intensity up to a threshold level below which the sensor is undamaged by the optical radiation, and decreasing the transmittance of the particle-containing space in response to incident optical radiation above the threshold level by heating of particles to a temperature at which at least partial vaporization and ionization of heated particles occur so as to increase scatter and absorption within the space whereby optical radiation reaching the sensor is limited to an intensity below which damage to the sensor occurs.

2. An optical limiting method as defined in claim 1 which includes selecting carbon particles for the oscillating solid particles.

3. An optical limiting method as defined in claim 1 which includes selecting silver-coated glass spheres for the oscillating solid particles.

4. An optical limiting method as defined in claim 1 which includes employing solid particles having a diameter no larger than the shortest wavelength of incident optical radiation to be limited.

5. An optical limiting method as defined in claim 1 wherein the particle-containing space also contains air.

6. An optical limiting method as defined in claim 1 which includes focusing incident optical radiation at the space containing solid particles.

7. An optical limiting method as defined in claim 6 which includes focusing optical radiation from the space containing solid particles at said sensor.

8. An optical limiting method as defined in claim 1 which includes applying a fixed electric field across a pair of electrodes for oscillation of said solid particles between said electrodes.

9. An optical limiting method as defined in claim 8 including locating the oscillating solid particles in a container having opposite walls which are transmissive of optical radiation, and
   transmitting optical radiation through said opposite walls of the container.

10. An optical limiting method as defined in claim 9 including evacuating air from said container.

11. An optical limiting method as defined in claim 8 including converging of lines of force of the electric field adjacent to the focus of incident optical radiation for concentrating oscillating solid particles thereat.

12. A system for coupling incident optical radiation to a sensor and limiting the intensity of optical radiation reaching the sensor, said system comprising
   a pair of spaced electrodes defining a space therebetween,
   a DC voltage source connected to said electrodes for supplying an electric field in the space between said electrodes,
   solid particles which oscillate between said electrodes in the space therebetween, at least some of which particles have a diameter smaller than the smallest wavelength of optical radiation to be limited in intensity by the coupling system,
   means for transmitting optical radiation to the sensor through the particle-containing space between said electrodes including means for focusing the optical radiation at the particle-containing space, the transmittance of the particle-containing space being substantially constant for optical radiation intensity up to a threshold intensity level, above the threshold level solid particles being heated and thermally expanded for increased scatter and absorption to decrease the transmittance of the particle-containing space and additionally limit the intensity of optical radiation reaching the sensor.

13. A system as defined in claim 12 including a container for said spaced electrodes which includes opposite walls which are transmissive of optical radiation, through which walls the radiation is transmitted.

14. A system as defined in claim 13 wherein the container comprises a closed container from which gases have been evacuated.

15. A system as defined in claim 13 wherein the container comprises a closed container in which air is replaced by a rare gas.

16. A system as defined in claim 12 wherein said solid particles comprise carbon particles.

17. A system as defined in claim 12 wherein said solid particles comprise silver-coated glass spheres.

18. A system as defined in claim 12 including means for converging lines of force of the electric field adjacent to the focus of the optical radiation to provide for a concentration of oscillating solid particles thereat.

19. A system as defined in claim 18 wherein said means for converging lines of force comprise depressions formed in opposing faces of said spaced electrodes.

* * * * *